US008965623B2

(12) United States Patent
Rakshit

(10) Patent No.: US 8,965,623 B2
(45) Date of Patent: Feb. 24, 2015

(54) AUTOMATED CLEANING IN A SENSOR NETWORK

(75) Inventor: Sarbajit K. Rakshit, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 207 days.

(21) Appl. No.: 13/469,171

(22) Filed: May 11, 2012

(65) Prior Publication Data

US 2013/0304301 A1    Nov. 14, 2013

(51) Int. Cl.
*G01C 22/00* (2006.01)
*G05D 1/00* (2006.01)
*B25J 5/00* (2006.01)
*B25J 19/02* (2006.01)
*G05B 19/18* (2006.01)

(52) U.S. Cl.
USPC .......... 701/25; 701/26; 701/400; 318/568.12; 318/568.16; 318/580; 700/250; 901/1

(58) Field of Classification Search
USPC .......... 701/24–28, 200; 700/250; 318/568.12, 318/568.16, 580; 15/3; 901/1
See application file for complete search history.

(56) References Cited

U.S. PATENT DOCUMENTS

| | | | |
|---|---|---|---|
| 6,438,456 B1 * | 8/2002 | Feddema et al. | 700/245 |
| 6,459,955 B1 * | 10/2002 | Bartsch et al. | 700/245 |
| 6,615,108 B1 * | 9/2003 | Peless et al. | 700/245 |
| 6,748,297 B2 * | 6/2004 | Song et al. | 700/259 |
| 7,173,391 B2 * | 2/2007 | Jones et al. | 318/568.12 |
| 7,188,000 B2 * | 3/2007 | Chiappetta et al. | 700/245 |
| 7,248,951 B2 * | 7/2007 | Hulden | 701/23 |
| 7,251,853 B2 | 8/2007 | Park et al. | |
| 2004/0204804 A1 * | 10/2004 | Lee et al. | 701/23 |
| 2006/0293788 A1 | 12/2006 | Pogodin | |
| 2007/0271004 A1 | 11/2007 | Kim et al. | |
| 2008/0058987 A1 | 3/2008 | Ozick et al. | |
| 2008/0276407 A1 | 11/2008 | Schnittman et al. | |
| 2008/0281470 A1 | 11/2008 | Gilbert, Jr. et al. | |
| 2009/0228165 A1 | 9/2009 | Ozick et al. | |
| 2011/0271469 A1 | 11/2011 | Ziegler et al. | |

OTHER PUBLICATIONS

Alankus G. et al., "Spatiotemporal Query Strategies for Navigation in Dynamic Sensor Network Environment" IEEE/RSJ International Conference on Intelligent Robots and Systems (IROS 2005), Aug. 2-6, 2005 [online], Retrieved from the Internet: <URL: http://ieeexplore.ieee.org/stamp/stamp.jsp?tp=&arnumber=1545134>.

(Continued)

*Primary Examiner* — James Trammell
*Assistant Examiner* — Majdi Alsomiri
(74) *Attorney, Agent, or Firm* — John W. Hayes

(57) ABSTRACT

A system, method and computer program product for attending to an environmental condition by an electronic cleaning device. A computer receives one or more data signals from one or more sensors through a network, with each of the one or more sensors associated with a physical location. The computer determines that due to an environmental condition a signal strength of the one or more data signals received from the one or more sensors is out of a threshold value range. The computer determines an optimal route from a current location of the electronic cleaning device to the one or more physical locations of the one or more sensors associated with the one or more data signals experiencing signal strength out of the threshold value range.

19 Claims, 5 Drawing Sheets

(56) References Cited

OTHER PUBLICATIONS

Batalin M. et al., "Mobile Robot Navigation using a Sensor Network" Proceedings of the 2004 IEEE International Conference on Robotics & Automation, New Orleans, LA, Apr. 2004, pp. 636-641 [online], Retrieved from the Internet: <URL: http://ieeexplore.ieee.org/stamp/stamp.jsp?tp=&arnumber=1307220>.

Clark E., Aug. 22, 2007 "Roomba Vacuum Cleaning Robot Range Updated" iRobot Roomba 500 series, [online], [retrieved on: Feb. 9, 2012]. Retrieved from the internet: <URL: http://www.gizmag.com/roomba-vacuum-cleaning-robot-range-updated/7854/>. Copyright Gizmag 2003-2012.

Hanlon M., Feb. 21-22, 2007 "Intellibot IV800 Robotic Vacuum for Industrial Cleaning" [online], [retrieved on: Feb. 9, 2012]. Retrieved from the Internet <URL: http://www.gizmag.com/go/6869/>. Copyright Gizmag 2003-2012.

Item Number: 27001, "iRobot: iRobot Scooba® 230 + Essentials Kit", iRobot Corporation copyright 2012, [online], [retrieved on: Feb. 9, 2012]. Retrieved from the Internet: <URL: http://store.irobot.com/product/index.jsp? productId=11033986>.

Low, K. et al., "Wireless Sensor Networks for Industrial Environments", Proceedings of the 2005 International Conference on Computational Intelligence for Modelling, Control and Automation, and International Conference on Intelligent Agents, Web Technologies and Internet Commerce (CIMCA-IAWTIC'05), Copyright 2005 IEEE.

* cited by examiner

AUTOMATED CLEANING IN A SENSOR NETWORK

FIELD OF THE INVENTION

The present invention relates generally to electronic cleaning devices and more specifically to automated cleaning in a sensor network using electronic cleaning devices.

BACKGROUND

Automated robot devices which perform basic cleaning and maintenance tasks are common today. A typical cleaning device is usually made up of two main parts, a cleaning robot and a docking station. The docking station receives information from sensors located on the cleaning device and maps out the environment. The cleaning robot performs tasks based on environment details provided by the docking station. To begin the process of cleaning an area, the cleaning device synchronizes with the associated docking station. The synchronization lets the cleaning robot know where the docking station is located in reference to where the cleaning robot travels. Also, the docking station charges the cleaning robot when the battery power of the cleaning robot depletes.

Known cleaning robots typically begin the cleaning process by first sending an infrared signal to the docking station. Based on the time required for the signal to be deflected back to the cleaning robot, the cleaning robot will know how long the cleaning robot should spend cleaning the room. After a cleaning time for the area is established, the cleaning robot performs the task of cleaning the area. A cleaning robot moves in a programmed algorithmic path and relies on sensors located on the cleaning robot to guide the cleaning robot through the environment. An object sensor may help redirect the cleaning robot if it encounters an obstacle which cannot be moved. The cleaning robot may include a wall sensor with a primary function of outlining the walls of the area the cleaning robot is cleaning. When the cleaning robot encounters a wall, the cleaning robot uses the infrared sensors to mark up the edges of the room to make operations more efficient. All of this sensor information is relayed to the docking station where it is processed and a path is established for the cleaning robot.

Time constraints that the docking station establishes to clean a certain area may not allow for the algorithmic pattern to cover the whole area desired to be cleaned. The algorithmic pattern may also overlap paths, relaying to the cleaning robot to travel over a cleaned area. The algorithmic pattern exists to conserve battery life so the cleaning robot can clean multiple rooms between charges. Such a known cleaning process does not take into account that the user might only want certain areas of a room cleaned rather than the whole room since the cleaning robot is only bound by physical objects rather than certain established areas.

SUMMARY

Aspects of the present invention disclose a method, computer system and computer product for attending to an environmental condition by an electronic cleaning device. In an example, a computer receives one or more data signals from one or more sensors through a network, with each of the one or more sensors associated with a physical location. The computer determines that due to the environmental condition signal strength of the one or more data signals received from the one or more sensors is below a threshold value. The computer determines an optimal route from a current location of the electronic cleaning device to the one or more physical locations of the one or more sensors associated with the one or more data signals experiencing signal strength below the threshold value.

DETAILED DESCRIPTION

Figure 1:
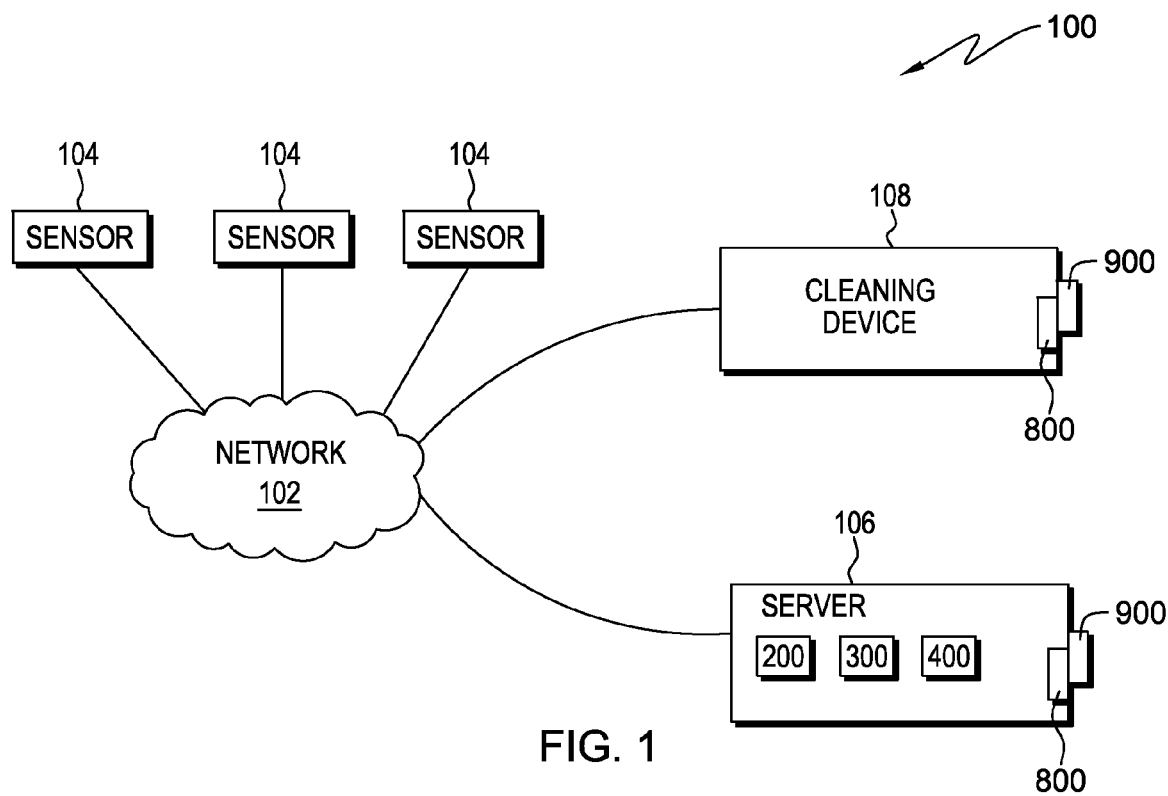
FIG. 1 depicts a cleaning system according to an embodiment of the present invention for establishing a cleaning process based on signal drop in a sensor network.

The present invention will now be described in detail with reference to the figures. FIG. 1 depicts a cleaning system generally designated 100 according to one embodiment of the present invention.

Cleaning system 100 includes a server computer 106 which controls one or more electronic cleaning devices 108. In the depicted example, sensors 104 are connected to server computer 106 via a sensor network 102. Server computer 106 tracks and controls electronic cleaning devices 108 in the connectivity vicinity of sensor network 102. Server computer 106 receives information from sensors 104, and analyzes the information for a signal strength that corresponds to a signal drop occurring due to an environmental condition. Server computer 106 includes a sensor calibration program 200, which allows for the calibration of sensors 104 with considerations to conditions in the surrounding environment. Server computer 106 includes a signal strength identification program 300 which identifies whether sensors 104 experience a change in signal strength. Server computer 106 also includes a cleaning path determination program 400, which determines a route for electronic cleaning device 108 to take based on the location of the one or more sensors 104 experiencing a change in signal strength.

The exemplary cleaning system 100 includes sensors 104 connected to server computer 106 via sensor network 102. Sensors 104 are positioned in a physical area where electronic cleaning device 108 performs the task of attending to environmental conditions by restoring a desired signal range in one or more sensors 104. Electronic cleaning device 108 may be, but is not limited to: a cleaning robot, a vacuum, a power wash system, and a floor buffer system. The placement of sensors 104 is dependent on the preference of an individual utilizing cleaning system 100. Sensors 104 act as a path for electronic cleaning device 108 when attending to an environmental condition. Sensors 104 may be, but are not limited to: an infrared sensor, a Doppler sensor, and a proximity sensor. In one example, sensors 104 are placed in the area where there is a higher likelihood that changes in the surrounding environment may occur. Such environmental condition changes may be, but are not limited to: dust cover, small object obstruction, and a spilling of a fluid. Electronic cleaning device 108, programmed to attend to the environmental condition, eliminates the environmental condition by restoring the surrounding area to a level of desired predetermined conditions. Server computer 106 analyzes each signal supplied by independently operating sensors 104 that are connected via sensor network 102. Server computer 106 contains programs 200, 300, and 400, which receives signal information from sensors 104, determines the signal strength, and assigns to electronic cleaning device 108 a route toward the location of the one or more sensors experiencing a signal drop. Server computer 106 controls electronic cleaning device 108, which attends to the area associated with sensors 104 experiencing the signal change.

In another example, a user controls electronic cleaning device 108. In this example, server computer 106 controls a visual display on electronic cleaning device 108. The visual display on electronic cleaning device 108 includes a user interface that allows server computer 106 to provide information obtained from sensors 104 to the user of the electronic cleaning device. Such information obtained from sensors 104 may be, but is not limited to: the location of sensors, the magnitude of signal change from individual sensor, and possible environmental conditions causing the signal change in sensor. The user, through the user interface of electronic cleaning device 108, will be able to use electronic cleaning device to track over and around the area of sensors 104, to establish a map of the sensor locations. Server computer 106 can then direct the user of electronic cleaning device 108 through the use of the user interface to the location of sensors 104 experiencing a signal change. When a signal change occurs in one or more sensors 104, the map depicted on the user interface of electronic cleaning device 108 specifies the location of one or more sensors experiencing a signal change. Server computer 106, through the user interface, displays the direction to the location of sensor 104 experiencing the signal change to the user of electronic cleaning device 108. Once the user arrives to the area surrounding one or more sensors 104 experiencing the signal change, the user cleans the area around the signal change according to the environmental condition causing the signal change. Once the environmental condition is attended to by the user of electronic cleaning device 108, restoring a desired signal range in one or more sensors 104, the user interface on electronic cleaning device may display the restored signal information.

Figure 2:
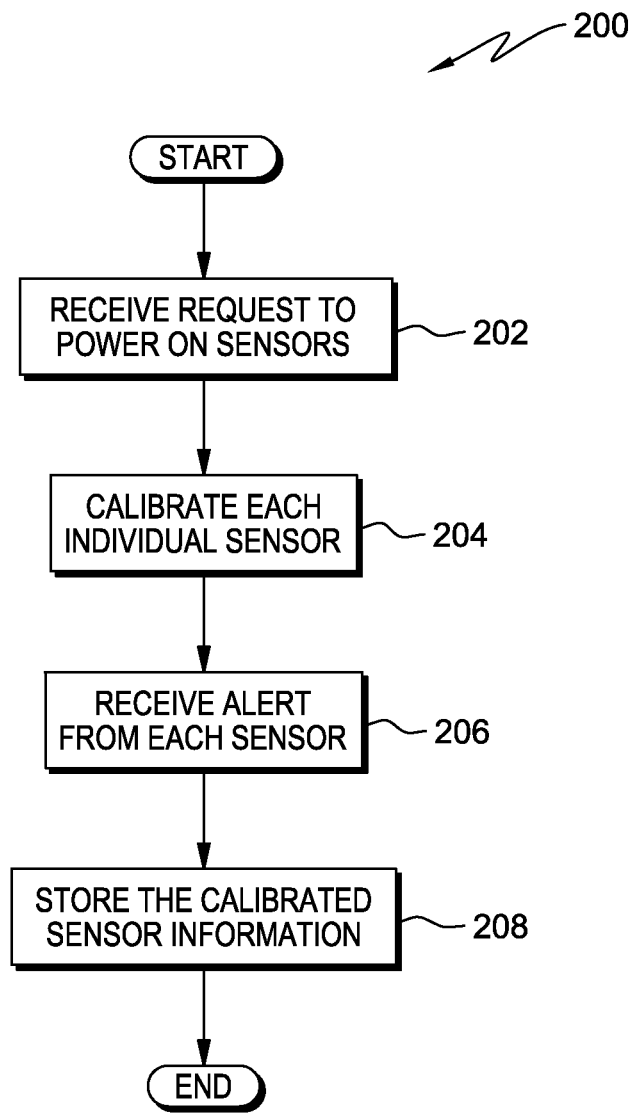
FIG. 2 is a flow chart illustrating the steps of a sensor calibration program installed on a server computer for establishing calibrated threshold limits.

FIG. 2 is a sensor calibration program 200 allowing the user, through the user interface on electronic cleaning device 108, to set a threshold limit range, according to the environmental conditions. Server computer 106 stores sensor calibration program 200, which the user of electronic cleaning device 108 may control through the user interface of the electronic cleaning device. Server computer 106 operates one or more sensors 104 which are in the operating range of electronic cleaning device 108 and connected to the server computer via sensor network 102. In step 202, sensor calibration program 200 receives a request to power on one or more sensors 104. Sensor calibration program 200 initiates the power on procedure by sending an alert out via one or more sensor networks 102 in the vicinity of server computer 106 and requests to power on one or more sensors 104 via each corresponding sensor network. In response to sensor calibration program 200 powering on one or more sensors 104, the sensor calibration program determines the location of the sensors within the operating range of electronic cleaning device 108. In one example, sensor calibration program 200 differentiates sensors 104 depending on the corresponding sensor networks 102 that are associated with a given area.

In step 204, sensor calibration program 200 calibrates each individual sensor 104 establishing a base referencing value for the threshold limit ranges. Sensor calibration program 200 tracks future environmental changes by calibrating each sensor 104 to the present environmental conditions. If an environmental condition occurs, a signal change in sensor 104 will occur. The magnitude of the signal change is measured from the reference point of the calibrated signal strength value. In step 206, sensor calibration program 200 receives an alert from every individual sensor 104 connected via sensor network 102 containing the calibrated sensor signal strength information. The method by which sensor calibration program 200 receives calibrated sensor 104 information may be, but is not limited to: sensor calibration program receiving a signal produced by one or more sensors, and by the sensor calibration program sending a signal to one or more sensors which will then be relayed back to the sensor calibration program. Sensor calibration program 200 records calibrated signal strength information emitted by sensors 104. In response to sensor calibration program 200 receiving all the information, sensor calibration program maps the location of all sensors 104 and associated signal strength of the sensors. In an example, the map that includes the location of all sensors 104 is displayed on the user interface of electronic cleaning device 108 in a way that provides the user a visual location of the signal change and where there is an environmental condition that needs attention. In response to sensor calibration program 200 receiving the information from sensors 104, in step 208, sensor calibration program stores the sensor calibration information to be later referenced to as a threshold limit range. In an example, the threshold limit range of individual sensors 104 in sensor network 102 can be altered based on the preference of the user through the user interface of electronic cleaning device 108. Altering the threshold limit allows for a change of responsiveness of sensor calibration program 200 notifying electronic cleaning device 108 of any environmental conditions that require attention. In response to changing the responsiveness of sensor calibration program 200, the sensitivity of sensors 104 to the surrounding environmental conditions decreases, allowing electronic cleaning devices 108 to operate less frequently.

Figure 3:
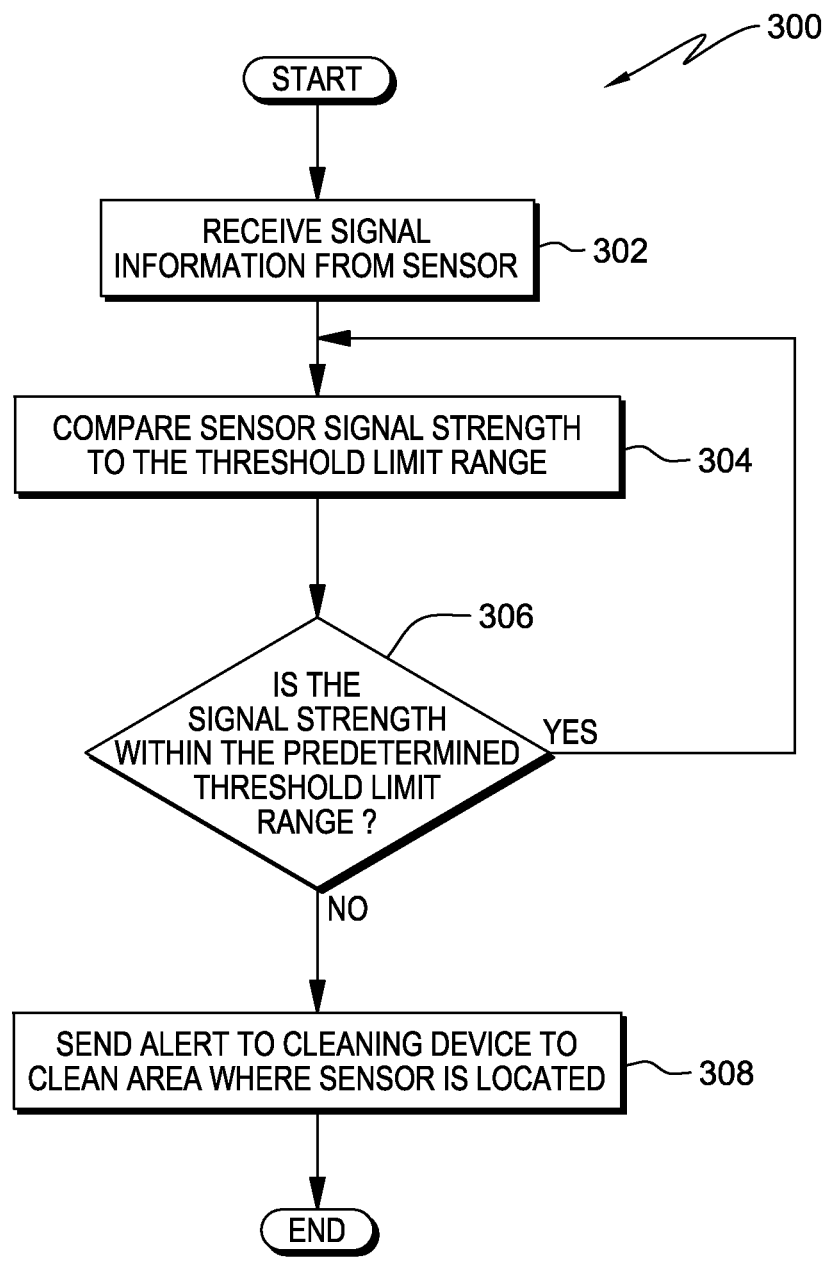
FIG. 3 is a flow chart illustrating the steps of a program installed on a server computer for identifying signal strength.

FIG. 3 is a flow chart depicting an exemplary embodiment of the signal strength identification program 300 for analyzing the signal strength of sensors 104 in sensor network 102. The signal strength of sensors 104 is dependent on the environmental conditions. In response to an environmental condition obstructing the signal of one or more sensors 104, signal strength identification program 300 informs electronic cleaning device 108 of the location of the signal change in the sensor. In step 302, signal strength identification program 300 receives information from every sensor. Signal strength identification program 300 measures the signal strength based on the amount of information being transferred. In an example, signal strength identification program 300 may receive information from sensors 104 every hour so signal strength identification program 300 can determine if electronic cleaning device 108 needs to be notified of a pending environmental condition. In step 304, signal strength identification program 300 compares the signal strength to the pre-determined threshold limit range, such as the calibrated signal information. In response to the signal strength remaining within the threshold limit range established by sensor calibration program 200 for one or more sensors 104, signal strength identification program 300 continues receiving information from the one or more sensors. If a signal change of a small magnitude occurs in sensor 104, signal strength identification program 300 may not notify electronic cleaning device 108 of the environmental condition due to the threshold limit range not being exceeded for the specific sensor. In response to the signal strength found within the predetermined threshold limit range (positive branch of decision 306), signal strength identification program 300 loops back to step 304. In response to the signal strength falling out of the threshold limit range (negative branch of decision 306), in step 308 signal strength identification program 300 sends an alert to electronic cleaning device 108 containing the information of the location of sensors 104 experiencing a signal change in the corresponding sensor network 102. In an example, the threshold limit range can be overridden by the user through the user interface of electronic cleaning device 108. In this example, a visual display associated with the electronic cleaning device 108 allows the user to input the threshold limit range for sensors 104. In addition to creating the threshold limit range, the user through the user interface on electronic cleaning device 108 may also adjust the sensitivity of sensors 104 dependent on the preference of the user. Adjusting the sensitivity may insure the signal change by sensor 104 is due to an environmental condition rather than a simple obstruction that causes the signal to change in strength. In the examples, the user interface is associated with the electronic cleaning device 108 and is controlled by server computer 106 where all the inputs from the sensors 104 are controlled by server computer 106. Signal strength identification program 300 may also have troubleshooting instructions for situations where sensors 104 fail or become non-responsive. In the case where one or more sensors 104 become nonresponsive, signal strength identification program 300 may remind the user through the user interface of electronic cleaning device 108 of the issue concerning the nonresponsive sensors.

Figure 4:
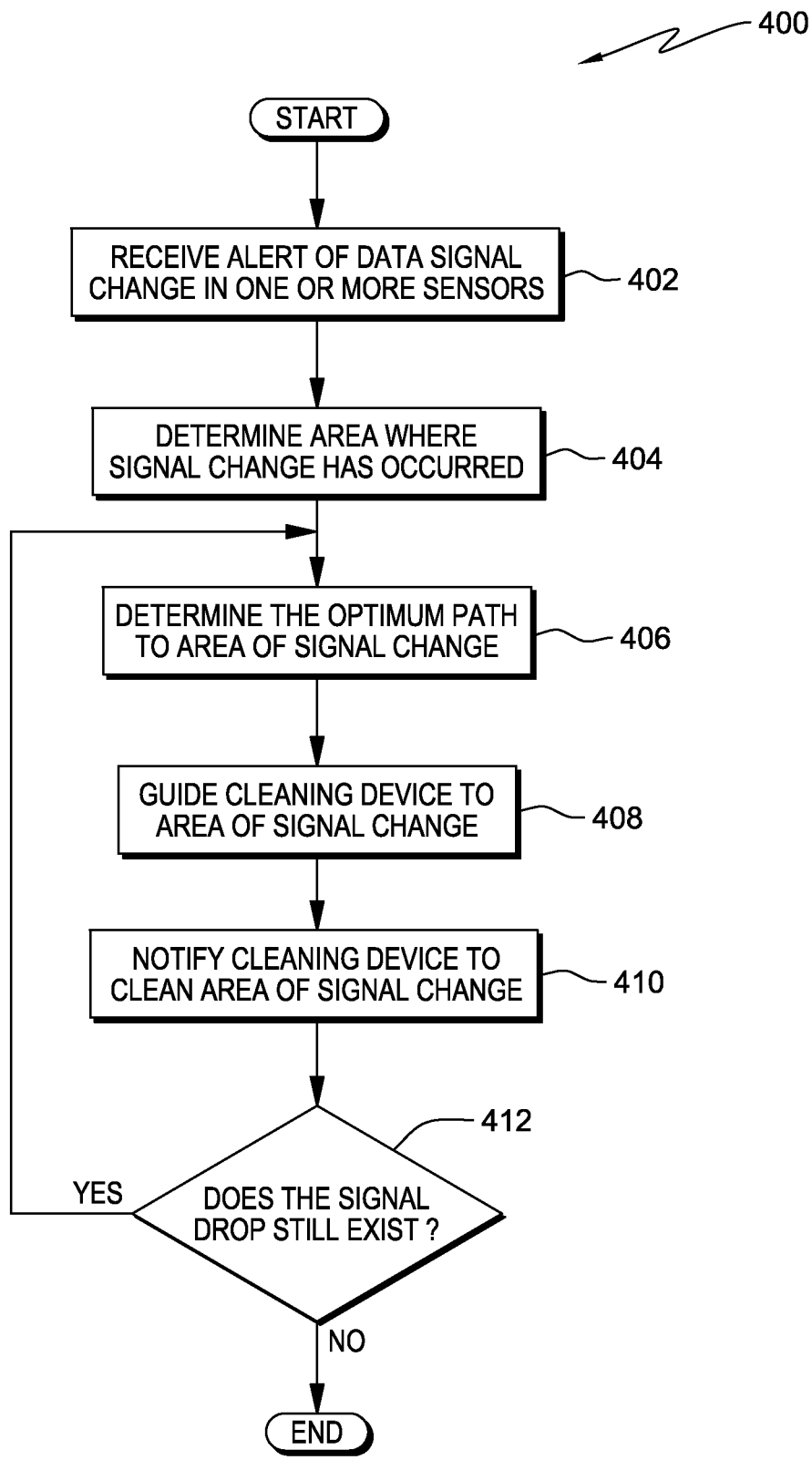
FIG. 4 is a flow chart illustrating the steps of a program installed on a server computer for determining a cleaning path.

FIG. 4 is a flow chart depicting an exemplary embodiment of cleaning path determination program 400 determining the optimum route for electronic cleaning device 108 to travel in order to attend to an environmental condition based on a signal change in one or more sensors 104. In step 402, cleaning path determination program 400 receives an alert of the signal change from one or more sensors 104. In step 404, cleaning path determination program 400 determines the area where the signal change occurred. An exemplary embodiment would include a single electronic cleaning device 108 in sensor network 102 where two or more sensors 104 experience a signal change. Cleaning path determination program 400 identifies each of sensors 104 experiencing the signal change. In response to determining sensors 104 are experiencing the signal change, cleaning path determination program 400 determines the location of sensors that need attention from electronic cleaning device 108 to restore the signal strength in sensors to the desired threshold limit range.

In step 406, cleaning path determination program 400 determines the optimum path for electronic cleaning device 108 to travel in order to attend to the area where one or more sensors 104 experience a signal change. In an example, electronic cleaning device 108 has a user interface which notifies and/or depicts to the user where the one or more sensors 104 experiencing the signal change are located. The visual display may also depict an optimum path, in this case the shortest route, to attend to sensors 104 experiencing the signal change. The user interface guides the user of electronic cleaning device 108 through the use of sensors 104 acting as a path to the location of the one or more corresponding areas that include the sensors experiencing the signal change. In step 408, cleaning path determination program 400 guides electronic cleaning device 108 through the area to the location of sensors 104 where a signal change is experienced due to an environmental condition. In an example, automatic electronic cleaning device 108 navigates through the area using sensors 104 connected through sensor network 102 as possible pathways to the location of one or more sensors experiencing a signal change due to dust cover. In step 410, cleaning path determination program 400 notifies electronic cleaning device 108 to perform the given task of cleaning the area due to the dust cover within the perimeter of one or more sensors 104 experiencing the signal change. In step 412, cleaning path determination program 400 measures the signal strength of sensors 104, which correspond to areas that may receive a cleaning by electronic cleaning device 108. In response to determining there is still a signal change, cleaning path determination program 400 loops back to step 406. In response to signal strength being restored, cleaning path determination program 400 notifies electronic cleaning device 108 to continue on the predetermined path to the location of the next one or more sensors 104 experiencing a signal change. In an example, where there is only one sensor 104 experiencing a signal change, cleaning path determination program 400 may set electronic cleaning device 108 on standby after the electronic cleaning device attends to the sensor experiencing the signal change. Responsive to cleaning path determination program 400 determining a signal change where no signal is found from one or more sensors 104, cleaning path determination program 400, through a user interface, notifies the user of electronic cleaning device 108 of the complete signal loss and the possibility of one or more sensor failures. Cleaning path determination program 400, through the user interface, displays the location of possible sensor 104 failure and cleaning path determination program 400 directs electronic cleaning device 108 to the known location of the sensor failure.

Figure 5:
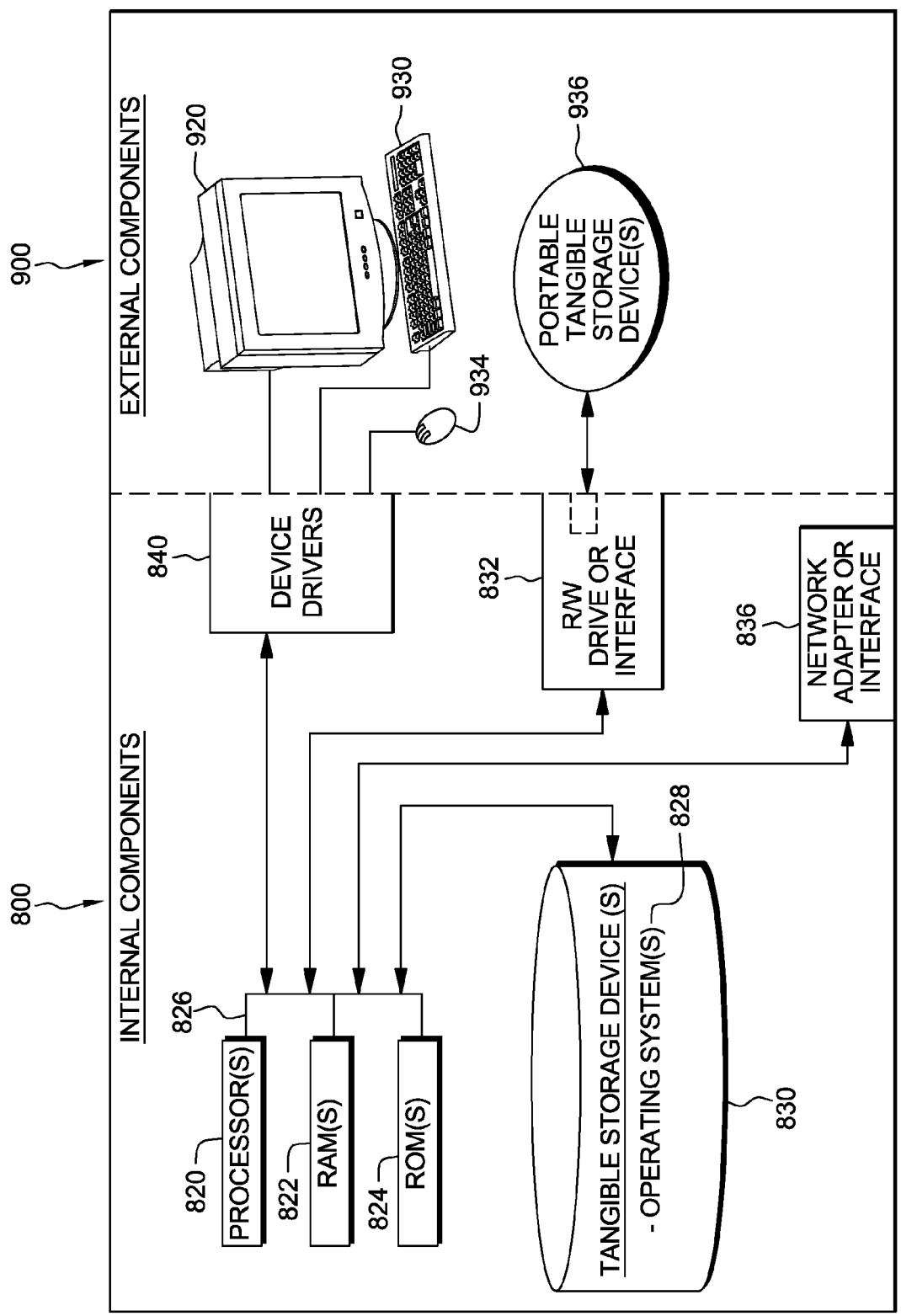
FIG. 5 is a block diagram depicting components of the electronic cleaning device and server computer shown in FIG. 1 in accordance with an illustrative embodiment.

FIG. 5 shows a block diagram of internal components 800 and external components 900 of electronic cleaning device 108 and server computer 106 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Computer system 800, 900 is representative of any electronic device capable of executing machine-readable program instructions. Computer system 800, 900 may be representative of a smart phone, a computer system, PDA, or other electronic devices. Examples of computing systems, environments, and/or configurations that may represented by computer system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Electronic cleaning device 108 and server computer 106 include respective sets of internal components 800 and external components 900 illustrated in FIG. 5. Each of the sets of internal components 800 includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and programs 300, 400 and 500 in electronic cleaning device 108 and in server computer 106 are stored on one or more of the respective computer-readable tangible storage devices 830 for execution by one or more of the respective processors 820 via one or more of the respective RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more portable computer-readable tangible storage devices 936 such as a CD-ROM, DVD, memory stick, magnetic tape, magnetic disk, optical disk or semiconductor storage device. The programs 200, 300 and 400 in server computer 106 can be stored on one or more of the respective portable computer-readable tangible storage devices 936, read via the respective R/W drive or interface 832 and loaded into the respective hard drive 830.

Each set of internal components 800 also includes network adapters or interfaces 836 such as a TCP/IP adapter cards, wireless wi-fi interface cards, or 3G or 4G wireless interface cards or other wired or wireless communication links. The programs 200, 300 and 400 in server computer 106 can be downloaded to respective computer systems from an external computer via a network (for example, the Internet, a local area network or other, wide area network) and respective network adapters or interfaces 836. From the network adapters or interfaces 836, the programs 200, 300 and 400 in server computer 106 are loaded into the respective hard drive 830. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Aspects of the present invention have been described with respect to block diagrams and/or flowchart illustrations of methods, apparatus (system), and computer program products according to embodiments of the invention. It will be understood that each block of the flowchart illustrations and/or block diagrams, and combinations of blocks in the flowchart illustrations and/or block diagrams, can be implemented by computer instructions. These computer instructions may be provided to a processor of a general purpose computer, special purpose computer, or other programmable data processing apparatus to produce a machine, such that instructions, which execute via the processor of the computer or other programmable data processing apparatus, create means for implementing the functions/acts specified in the flowchart and/or block diagram block or blocks.

The aforementioned programs can be written in any combination of one or more programming languages, including low-level, high-level, object-oriented or non object-oriented languages, such as Java, Smalltalk, C, and C++. The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet service provider). Alternatively, the functions of the aforementioned programs can be implemented in whole or in part by computer circuits and other hardware (not shown).

The foregoing description of various embodiments of the present invention has been presented for purposes of illustration and description. It is not intended to be exhaustive nor to limit the invention to the precise forms disclosed. Many modifications and variations are possible. Such modifications and variations that may be apparent to a person skilled in the art of the invention are intended to be included within the scope of the invention as defined by the accompanying claims.

The invention claimed is:

1. A method for attending to an environmental condition by an electronic cleaning device, the method comprising the steps of:
   a computer receiving one or more data signals from one or more sensors through a network, wherein each of the one or more sensors is positioned in a physical location;
   the computer determining that due to the environmental condition a signal strength of the one or more data signals received from the one or more sensors positioned in the physical location is out of a threshold value range;
   the computer determining an optimal route from a current location of the electronic cleaning device to the one or more sensors positioned in the physical location, wherein the one or more data signals of the one or more sensors are experiencing signal strength out of the threshold value range; and
   the computer sending an alert to the electronic cleaning device to clean the environmental condition at the one or more sensors until the signal strength of the one or more data signals received is no longer out of the threshold value range.

2. The method of claim 1, wherein the computer determines the optimal route from the current location of two or more electronic cleaning devices to the location of the environmental condition.

3. The method of claim 1, wherein the computer is associated with the electronic cleaning device.

4. The method of claim 3, wherein the network connecting the electronic cleaning device and the computer is a wireless network connection.

5. The method of claim 1, wherein the electronic cleaning device includes a user interface that is configured to depict one or more locations where the one or more sensors experiencing signal strength out of the threshold value range occurs.

6. The method of claim 1, wherein the one or more sensors comprises an infrared sensor, a Doppler sensor, and a proximity sensor.

7. The method of claim 1, wherein the computer determines the optimal route to two or more sensors experiencing an environmental condition by considering, at least in part, an order of attending to the sensor having a signal strength further out of the threshold value range before attending to the sensor having a signal strength closer to the threshold value range.

8. The method of claim 1, wherein the computer determines the optimal route to the one or more sensors experiencing an environmental condition by considering, at least in part, a least amount of distance traveled.

9. The method of claim 1, further comprising the steps of:
   the computer calibrating each of the one or more sensors to the environmental conditions to determine the signal strength threshold limit range; and responsive to the computer calibrating each sensor, the computer receiving a request to alter the threshold limit range by a user of the electronic cleaning device attending to the environmental condition.

10. A computer program product for attending to an environmental condition by an electronic cleaning device, the compute program product comprising:
one or more computer-readable, tangible storage devices;
program instructions, stored on at least one of the one or more storage devices, to receive one or more data signals from one or more sensors through a network, wherein each of the one or more sensors is positioned in a physical location;
program instructions, stored on at least one of the one or more storage devices, to determine that due to the environmental condition a signal strength of the one or more data signals received from the one or more sensors positioned in the physical location is out of a threshold value range;
program instructions, stored on at least one of the one or more storage devices, to determine an optimal route from a current location of the electronic cleaning device to the one or more sensors positioned in the physical location, wherein the one or more data signals of the one or more sensors are experiencing signal strength out of the threshold value range; and
program instruction, stored on at least one of the one or more storage devices, to send an alert to the electronic cleaning device to clean the environmental condition at the one or more sensors until the signal strength of the one or more data signals received is no longer out of the threshold value range.

11. The computer program product of claim 10, wherein the program instructions to determine an optimal route from a current location of the electronic cleaning device to the one or more physical locations of the one or more sensors associated with the one or more data signals experiencing signal strength out of the threshold value range, determines the optimal route from the current location of two or more electronic cleaning devices to the location of the environmental condition.

12. The computer program product of claim 10, wherein the computer is associated with the electronic cleaning device.

13. The computer program product of claim 12, wherein the network connecting the electronic cleaning device and the computer is a wireless network connection.

14. The computer program product of claim 10, wherein the electronic cleaning device includes a user interface that is configured to depict one or more locations where the one or more sensors experiencing signal strength out of the threshold value range occurs.

15. The computer program product of claim 10, wherein the one or more sensors comprises an infrared sensor, a Doppler sensor, and a proximity sensor.

16. The computer program product of claim 10, wherein instructions to determine an optimal route from a current location of the electronic cleaning device to the one or more physical locations of the one or more sensors associated with the one or more data signals experiencing signal strength out of the threshold value range, determines the optimal route to two or more sensors experiencing an environmental condition by considering, at least in part, an order of attending to the sensor having a signal strength that is further out of the threshold value range before attending to the sensor having a signal strength closer to the threshold value range.

17. The computer program product of claim 10, wherein instructions to determine an optimal route from a current location of the electronic cleaning device to the one or more physical locations of the one or more sensors associated with the one or more data signals experiencing signal strength out of the threshold value range, determines the optimal route to the one or more sensors experiencing an environmental condition by considering, at least in part, a least amount of distance traveled.

18. The computer program product of claim 10, further comprising:
program instructions, stored on at least one of the one or more storage devices, to calibrate each of the one or more sensors to the environmental conditions to determine the signal strength threshold limit range; and
program instructions, stored on at least one of the one or more storage devices, responsive to calibrating each sensor, to receive a request to alter the threshold limit range by a user of the electronic cleaning device attending to the environmental condition.

19. A computer system for attending to an environmental condition by an electronic cleaning device, the computer system comprising:
one or more computer processors;
one or more computer readable storage media; and
program instructions stored on the computer readable storage media for execution by at least one of the one or more computer processors, the program instructions comprising:
program instructions to receive one or more data signals from one or more sensors through a network, wherein each of the one or more sensors is positioned in a physical location;
program instructions to determine that due to the environmental condition a signal strength of the one or more data signals received from the one or more sensors positioned in the physical location is out of a threshold value range;
program instructions to determine an optimal route from a current location of the electronic cleaning device to the one or more sensors positioned in the physical location, wherein the one or more data signals of the one or more sensors are experiencing signal strength out of the threshold value range; and
program instructions to send an alert to the electronic cleaning device to clean the environmental condition at the one or more sensors until the signal strength of the one or more data signals received is no longer out of the threshold value range.

* * * * *